United States Patent
Thompson et al.

(10) Patent No.: US 11,903,335 B2
(45) Date of Patent: Feb. 20, 2024

(54) FLEXIBLE CONDUIT FOR AN AGRICULTURAL SYSTEM

(71) Applicant: CNH Industrial Canada, Ltd., Saskatoon (CA)

(72) Inventors: Dennis Thompson, Saskatoon (CA); Gerard James Gadzella, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 1124 days.

(21) Appl. No.: 16/357,045

(22) Filed: Mar. 18, 2019

(65) Prior Publication Data

US 2020/0296883 A1    Sep. 24, 2020

(51) Int. Cl.
*A01C 7/08*    (2006.01)
*F16L 27/107*  (2006.01)
*F16L 25/14*   (2006.01)

(52) U.S. Cl.
CPC ............ *A01C 7/082* (2013.01); *F16L 27/107* (2013.01); *F16L 25/14* (2013.01)

(58) Field of Classification Search
CPC ................................. A01C 7/082; F16L 27/10
See application file for complete search history.

(56) References Cited

U.S. PATENT DOCUMENTS

| | | | |
|---|---|---|---|
| 2,828,979 A | 4/1958 | Wiltse | |
| 4,050,721 A * | 9/1977 | Streit | F16L 47/065 |
| | | | 285/345 |
| 4,598,692 A | 7/1986 | Hitch | |
| 5,882,046 A * | 3/1999 | Thomas | F16L 27/11 |
| | | | 285/236 |
| 5,947,040 A | 9/1999 | Gregor | |
| 6,283,679 B1 | 9/2001 | Gregor et al. | |
| 6,443,671 B1 * | 9/2002 | Weiste | A01C 7/082 |
| | | | 406/92 |
| 6,668,738 B2 | 12/2003 | Lee et al. | |
| 9,738,200 B2 | 8/2017 | Roberge et al. | |
| 2003/0002927 A1 | 1/2003 | Frankeburger et al. | |
| 2012/0103238 A1 | 5/2012 | Beaujot et al. | |
| 2014/0265310 A1 * | 9/2014 | Halkyard | F16L 27/0857 |
| | | | 285/226 |
| 2014/0311598 A1 * | 10/2014 | Hui | A01C 7/084 |
| | | | 137/556.6 |
| 2017/0000017 A1 * | 1/2017 | Johnson | A01C 7/046 |
| | | | 406/92 |
| 2017/0305688 A1 | 10/2017 | Roberge et al. | |
| 2017/0369257 A1 * | 12/2017 | Bent | B65G 53/34 |

FOREIGN PATENT DOCUMENTS

| | | | | |
|---|---|---|---|---|
| DE | 10164036 A1 * | 7/2003 | ......... | F01N 13/1816 |
| EP | 1428994 A1 * | 6/2004 | ......... | F01N 13/1816 |
| FR | 2747175 A1 * | 10/1997 | ............. | F16L 27/11 |

* cited by examiner

*Primary Examiner* — Jamie L McGowan
(74) *Attorney, Agent, or Firm* — Rebecca L. Henkel; Rickard K. DeMille

(57) ABSTRACT

A conduit for an agricultural system includes a first end configured to couple to a metering system, a second end configured to couple to a pipe, one or more bellows disposed adjacent to the second end and configured to enable the conduit to flex adjacent to the second end, and a substantially rigid portion extending generally longitudinally from the first end to the one or more bellows, where the substantially rigid portion substantially rigidly supports the conduit between the first end and the one or more bellows.

16 Claims, 8 Drawing Sheets

FLEXIBLE CONDUIT FOR AN AGRICULTURAL SYSTEM

BACKGROUND

The disclosure relates generally to a flexible conduit for an agricultural system.

Generally, agricultural seeding implements are towed behind a work vehicle, such as a tractor. These implements generally contain a particulate material, such as seeds, fertilizer, and/or other agricultural product, which is distributed on or in the ground using various methods. Certain implements include a storage tank in which the particulate material is stored and a metering system configured to meter the particulate material from the storage tank. The particulate material is distributed from the metering system to row units, which are configured to distribute the particulate material on or in the ground. During operation, the metering system, pipes connected to the metering system, a frame of implement, and wheels or tracks coupled to the frame, may experience forces and movement associated with the implement moving over certain terrain. Particularly, uneven terrain may cause the implement to experience certain forces and movement. Additionally, loading of the particulate material into the storage tank, a weight distribution of the particulate material within the storage tank, and air pressurization within the storage tank and other portions of the implement may cause the implement and certain portions thereof to experience forces and movement. Such forces and movements may be translated along the implement and to the tank via rigid piping and conduits disposed along the implement.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a conduit for an agricultural system includes a first end configured to couple to a metering system, a second end configured to couple to a pipe, one or more bellows disposed adjacent to the second end and configured to enable the conduit to flex adjacent to the second end, and a substantially rigid portion extending generally longitudinally from the first end to the one or more bellows, where the substantially rigid portion substantially rigidly supports the conduit between the first end and the one or more bellows.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
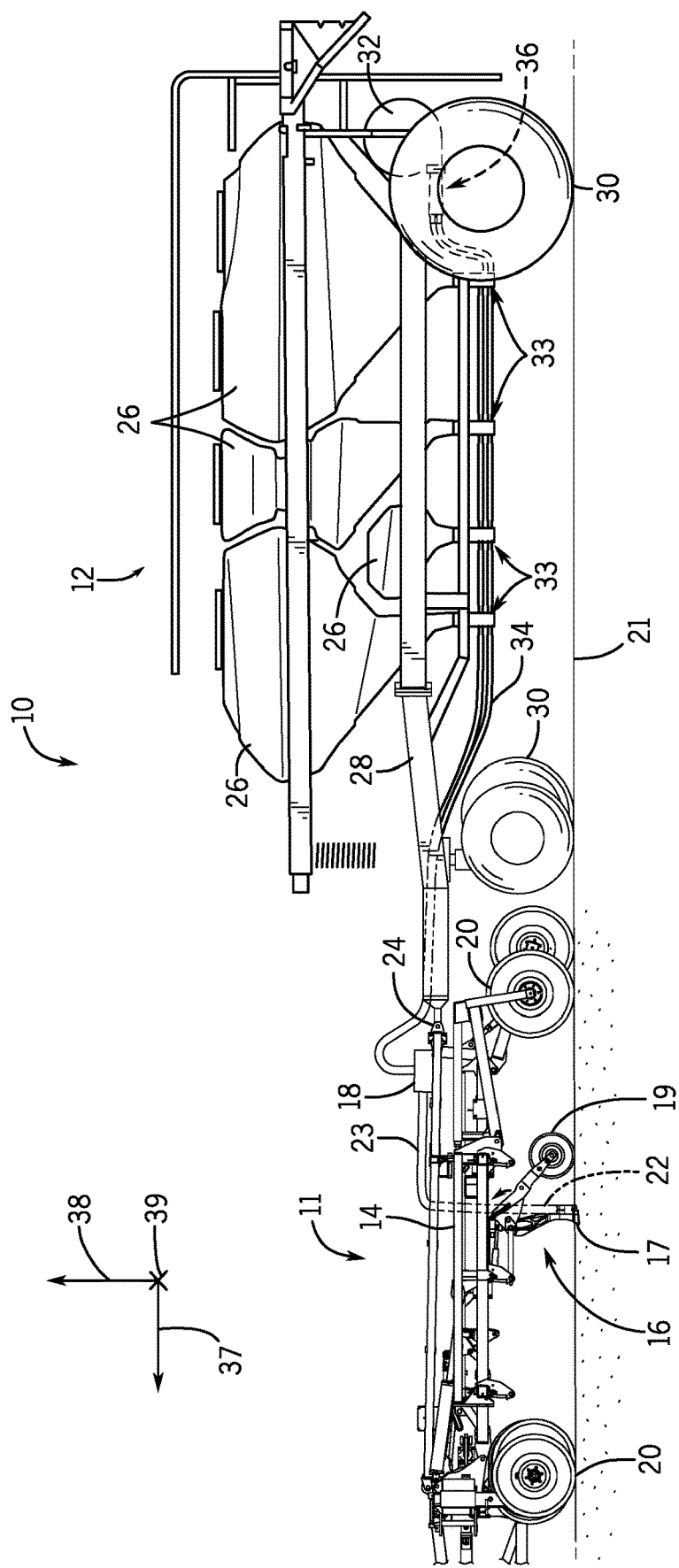
FIG. 1 is a side view of an embodiment of an agricultural system including an agricultural implement coupled to an air cart, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a flexible conduit for an agricultural system. Certain agricultural systems (e.g., air carts, implements, etc.) contain particulate material(s) (e.g., seeds, fertilizer, and/or other agricultural products) within a storage tank of the agricultural system. Certain agricultural systems are coupled to a respective implement and/or include an implement configured to distribute the particulate material within a field. The particulate material may flow from the storage tank and through a metering system, which is configured to control the flow of the particulate material (e.g., to meter the particulate material) to the field. Certain agricultural systems include piping (e.g., pipe(s), conduit(s), transfer section(s), passage(s)) configured to flow the particulate material from the storage tank, from the metering system, to the field, to a coupled implement, or a combination thereof. For example, the piping may also be coupled to an air source that generates an air flow through the piping to flow the particulate material. Additionally or alternatively, certain agricultural systems include multiple storage tanks coupled to respective metering systems. The piping may couple to and connect the multiple metering systems and may connect one or more of the metering systems to an implement. As such, the piping may flow the particulate material from the multiple metering systems to the implement and/or to the field.

As the agricultural system travels over the field, portions of the agricultural system may experience forces and movement. Particularly, uneven terrain may cause the agricultural system to experience certain forces and movement. For example, wheels coupled to a frame of the agricultural system may move generally up and down and may transfer forces to other portions of the agricultural system (e.g., to the frame, to the storage tank(s), to the metering system(s), to the piping, etc.). Additionally, loading of particulate material into the storage tank, unloading of the particulate material from the storage tank, air pressurization within the storage tank, or a combination thereof, may cause movement of the storage tank. The movement of the storage tank or of the metering system coupled to the storage tank may cause the agricultural product within the storage tank to shift and/or may make weighing the agricultural product within the storage tank difficult. In embodiments with multiple storage tanks and/or multiple metering systems connected by piping, movement by a first storage tank and coupled metering system may cause subsequent movement by a second storage tank and coupled metering system.

Accordingly, in certain embodiments, an agricultural system includes a conduit and/or a conduit assembly coupled to a metering system and to a pipe. The conduit or the conduit assembly is configured to flex in order to isolate movement of the metering system and the pipe with respect to one another. The pipe may be coupled to other portions of the agricultural system (e.g., to a second metering system, to a second conduit coupled to the second metering system, to an implement, to the air source, etc.). As such, the conduit or the conduit assembly is configured to substantially isolate movement of the metering system and a tank coupled to the metering system with respect to other portions of the agricultural system, and vice versa. The ability to isolate such movement facilitates weighing and/or estimating an amount of agricultural product within the storage tank, reduces stresses and loading on portions of the agricultural system to enable improved durability of the agricultural system, reduces the possibility of air leaks from developing within the agricultural system, and enables the agricultural system to more easily traverse the field, a roadway, and other surfaces. Further, the flexible conduits and conduit assemblies described herein may reduce costs associated with the agricultural system.

In certain embodiments, the conduit coupled to the metering system may include bellow(s) that enable the conduit to flex at a first end and a substantially rigid portion (e.g., rib(s)) that substantially rigidly support the conduit between a second end, opposite the first end, and the bellows. As such, the conduit may be configured to flex at the bellows to substantially isolate movement of the metering system and the pipe with respect to one another, while remaining substantially rigid at the substantially rigid portion to provide structural support for the conduit and a connection between the metering system and the pipe. In some embodiments, the conduit may include other flexible elements (e.g., in addition to or in place of the bellows) that may include flexible geometries, materials, etc. and that may perform similar functions compared the bellows described herein. For example, the other flexible elements may include a mesh structure, a stepped geometry, and other flexible configurations configured to enable the conduit to flex.

In some embodiments, the agricultural system may include the conduit assembly coupled to the metering system and to the pipe. The conduit assembly may include a substantially rigid conduit coupled to a substantially flexible conduit, to a connecting conduit, to the metering system, to the pipe, or a combination thereof. The substantially rigid conduit may substantially rigidly support the conduit assembly and the connection to the metering system and/or to the pipe. Additionally, the conduit assembly may include the substantially flexible conduit coupled to the substantially rigid conduit, to the connecting conduit, to the metering system, to the pipe, or a combination thereof. The substantially flexible conduit may include bellow(s) that enable the conduit assembly to flex and to isolate movement of the metering system and the pipe with respect to one another. In some embodiments, the conduit assembly may include the connecting conduit that connects the substantially rigid conduit to the substantially flexible conduit and/or that protrudes into the substantially rigid conduit and the substantially flexible conduit.

The conduit and the conduit assembly may be tapered such that a first end is smaller in diameter than a second end. The tapering may cause a venturi effect within the conduit and the conduit assembly that either accelerates air or an air/material mixture through the conduit or decelerates the air or the air/material mixture through the conduit, depending on the orientation of the conduit with respect to the metering system. For example, the conduit may be positioned at an inlet of the metering system and may include the end with a smaller diameter coupled to the metering system and the end with a larger diameter coupled to the piping. The air or the air/material mixture may enter the conduit at the end with the larger diameter, exit the conduit at the end with the smaller diameter, and then enter the metering system. The tapering of the conduit along the flow path of the air or of the air/material mixture (e.g., the narrowing diameter of the conduit) accelerates the air or the air/material mixture prior to entering the metering system. As such, the reduction in cross-sectional area of the conduit increases the velocity of the air or the air/material mixture and decreases static pressure to better enable particulate material from the metering system to be introduced into the air or the air/material mixture. In some embodiments, the conduit may be positioned at an exit of the metering system and may also include the end with the smaller diameter coupled to the metering system and the end with the larger diameter coupled to the piping. The air or the air/material mixture may exit the metering system, enter the conduit at the end with the smaller diameter, and exit the conduit at the end with the larger diameter. The tapering of the conduit along the flow path of the air or the air/material mixture (e.g., the expanding diameter of the conduit) decelerates the air or the air/material mixture after exiting the metering system.

With the foregoing in mind, the present embodiments relating to a flexible conduit may be utilized in any suitable agricultural system. For example, FIG. 1 is a side view of an embodiment of an agricultural system 10 including an agricultural implement 11 coupled to an air cart 12. As described in greater detail below, the agricultural system 10 may include a conduit or a conduit assembly configured to flex to substantially isolate movement of portions of the air cart 12. As depicted, the agricultural implement 11 includes a tool frame 14 coupled to a row unit 16 (e.g., ground engaging opener assembly), a header 18, and wheel assemblies 20. The agricultural implement 11 may be pulled by a work vehicle (e.g., a tractor) to deposit rows of particulate material (e.g., agricultural product). The wheel assemblies 20 may contact the surface of soil 21 to enable the agricultural implement 11 to be pulled by the work vehicle. As the agricultural implement 11 is pulled, a row of the particulate material may be deposited into the soil 21 by the row unit 16 (e.g., ground engaging opener assembly). Although only one row unit 16 is shown, the agricultural implement 11 may include multiple row units 16 organized in one or more rows across the agricultural implement 11. In some embodiments, the agricultural implement 11 may include one or more rows of 12, 14, 16, 18, 20, or more row units 16, which may each deposit a respective row of particulate material into the soil 21.

To facilitate depositing the particulate material, each row unit 16 (e.g., ground engaging opener assembly) in the illustrated embodiment, includes an opener 17, a press wheel 19, and a particulate material tube 22. While the opener 17 engages the soil 21, the opener 17 may exert a force onto the soil 21 that excavates a trench into the soil 21 as the row unit 16 travels through the field. The particulate material may be deposited into the excavated trench via the particulate material tube 22. Then, the press wheel 19 may pack soil 21 onto the deposited particulate material. In certain embodiments, the press wheel of at least one row unit may be omitted. For example, at least one press wheel may be mounted to the frame of the implement behind the at least one row unit. Furthermore, while the illustrated row unit includes a ground engaging opener assembly, in alternative embodiments, at least one row unit on the implement may include an applicator assembly configured to deposit particulate material onto the surface of the field, or any other suitable type of product deposition assembly.

The header 18 may provide the particulate material to the row units 16. In some embodiments, the header 18 may pneumatically distribute the particulate material from a primary line to secondary lines. In the illustrated embodiment, a primary line 34 directs particulate material from the air cart 12 (e.g., from metering systems 33 of the air cart 12) to the header 18. Additionally, the header 18 is configured to distribute the particulate material to the row units 16 via respective secondary lines 23. In certain embodiments, multiple primary lines may direct particulate material to multiple headers. Moreover, multiple secondary lines may extend from each header to respective row units. Furthermore, in certain embodiments, at least one secondary line may extend to a secondary header, and multiple tertiary lines may extend from the secondary header to respective row units.

In the illustrated embodiment, the air cart 12 is towed behind the agricultural implement 11. For example, the agricultural implement 11 may be coupled to the work vehicle by a first hitch assembly, and the air cart 12 may be coupled to the agricultural implement 11 by a second hitch assembly 24 (e.g., a towing hitch). However, in other embodiments, the agricultural implement may be towed behind the air cart. In further embodiments, the implement and the air cart may be part of a single unit that is towed behind the work vehicle or may be elements of a self-propelled vehicle.

The air cart 12 may centrally store particulate material and distribute the particulate material to the header 18. The air cart 12 includes storage tanks 26, a frame 28, wheel assemblies 30, and an air source 32. As illustrated, the second hitch assembly 24 is coupled between the tool frame 14 and the air cart frame 28, which enables the air cart 12 to be towed with the agricultural implement 11. Additionally, the storage tanks 26 are configured to centrally store the particulate material. In some embodiments, some or all of the storage tanks 26 may include multiple compartments for storing different types of particulate material. For example, a first compartment may store seeds while a second compartment may store a dry fertilizer. In such configurations, the air cart 12 may deliver both seeds and fertilizer to the implement 11 via separate distribution systems, or as a mixture through a single distribution system.

From the storage tanks 26, the particulate material may be fed into respective metering systems 33, which meter the particulate material, fluidize the particulate material via a fluidizing airflow from the air source 32, and distribute the particulate material to the header 18 via the primary line 34. As depicted, the metering systems 33 are mounted to the bottoms of the storage tanks 26. To facilitate distributing the particulate material, the fluidizing air generated by the air source 32 is guided though the metering systems 33 via a plenum 36. In some embodiments, the air source 32 may be one or more pumps and/or blowers powered by electric or hydraulic motor(s), for example. Additionally, while the illustrated embodiment includes the air cart 12 with multiple storage tanks 26 coupled to respective metering systems 33, some embodiments of the air cart may include a single storage tank coupled to a metering system.

As the agricultural system 10 traverses the soil 21 (e.g., during operation and/or transport of the agricultural system 10), the wheel assemblies 30 may generally follow a contour of the soil 21 and may transfer forces and/or movement to other portions of the agricultural system 10. In certain embodiments, loading of particulate material into the storage tanks 26, unloading of the particulate material from the storage tanks 26, air pressurization within the storage tanks 26, or a combination thereof, may cause movement of the storage tanks 26. Accordingly, the agricultural system 10 includes conduits 40 configured to substantially isolate movement of portions of the agricultural system 10 with respect to one another. As illustrated, the conduits 40 are coupled to the metering systems 33 and are configured to substantially isolate movement of the portions of the agricultural system 10 with respect to the metering systems 33 and the storage tanks 26. Additionally or alternatively, the conduits 40 are configured to substantially isolate movement of the storage tanks 26 and the coupled metering systems 33 with respect to one another (e.g., substantially isolate movement of a first storage tank 26 and a first coupled metering system 33 with respect to a second storage tank 26 and a second coupled metering system 33). As described in greater detail below, the conduits 40 may flex to substantially isolate the movement while maintaining the connections with the metering systems 33 and the other portions of the agricultural system 10 (e.g., piping and/or other conduits).

For purposes of discussion, reference may be made to a longitudinal axis or direction 37, a vertical axis or direction 38, and a lateral axis or direction 39. For example, the agricultural system 10 may be towed and/or may move generally along the longitudinal axis 37. Additionally, the particulate material stored in the storage tanks 26 may flow generally downward, along the vertical axis 38 and through the metering systems 33. After passing through the metering systems 33 and into the conduits 40, the particulate material may flow generally along the longitudinal axis 37 toward the agricultural implement 11.

Figure 2:
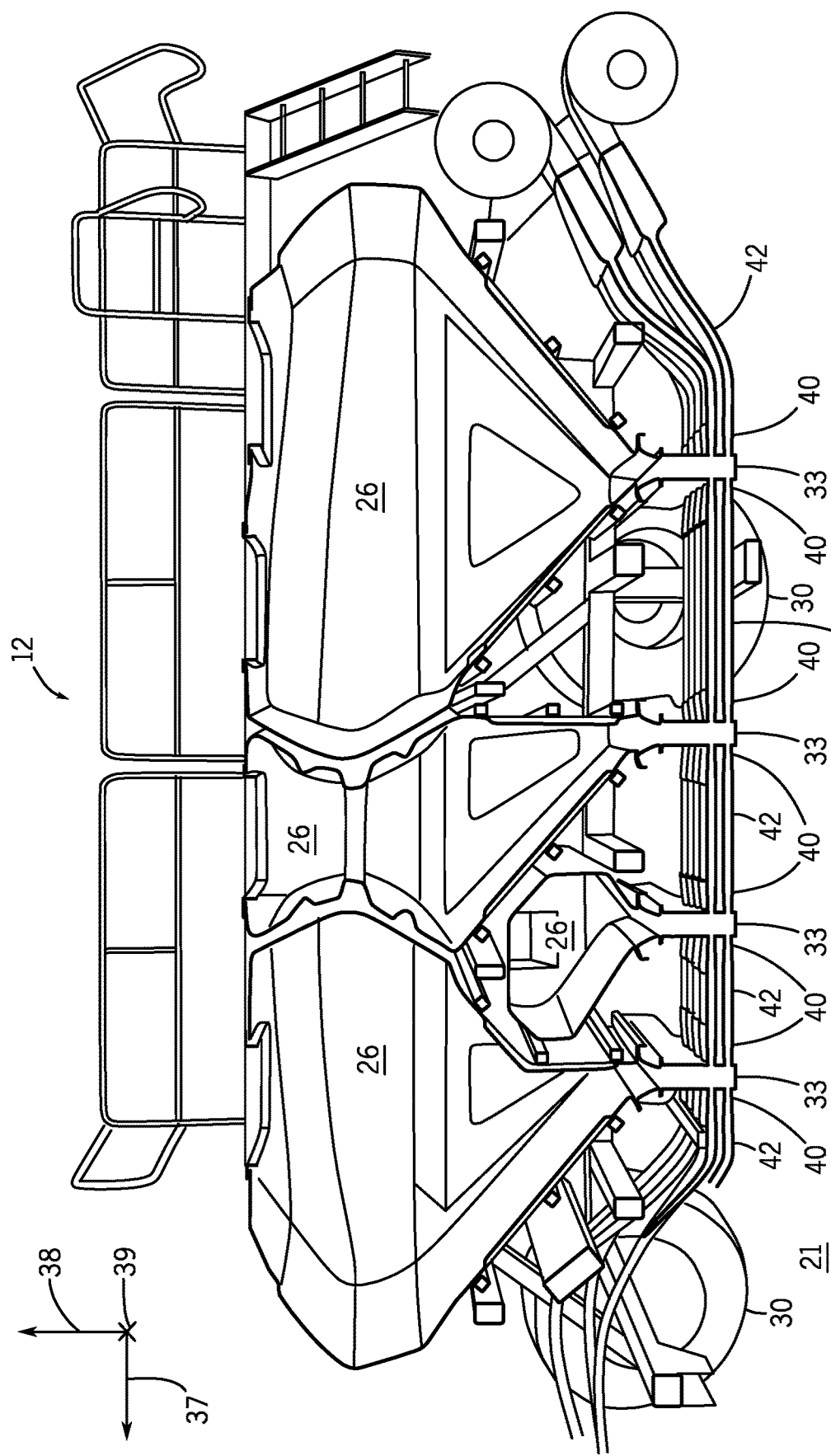
FIG. 2 is a cross-sectional side view of the air cart of FIG. 1, in accordance with an aspect of the present disclosure.

FIG. 2 is a cross-sectional side view of the air cart 12 of FIG. 1. As illustrated, the air cart 12 includes the storage tanks 26 coupled to the metering systems 33. While the illustrated embodiment includes four storage tanks 26 and four metering systems 33, other embodiments may include more or fewer storage tanks 26 (e.g., one storage tank 26, two storage tanks 26, three storage tanks 26, five storage tanks 26, etc.) and more or fewer metering systems 33 (e.g., one metering system 33, two metering systems 33, three metering systems 33, five metering systems 33, etc.).

Each of the storage tanks 26 is configured to centrally store the particulate material. The air cart 12 is configured to flow the particulate material through the metering system 33 coupled to each respective storage tank 26. After passing through the metering system 33, the particulate material flows generally along the longitudinal axis 37 (e.g., to the left in the illustrated embodiment) and passes through the conduits 40. Each of the conduits 40 is coupled to the metering system 33 and to pipes 42. Some pipes 42 are coupled to two conduits 40 (e.g., a respective conduit 40 at each end of the pipe 42) and other pipes 42 are coupled to one conduit 40. The pipes 42 may include any suitable material configured to flow the particulate material along the air cart 12 (e.g., plastic, metal, rubber, or a combination thereof) and may be any suitable conduit and/or shape that may provide for passage of the particulate material along the air cart 12. As such, the air cart 12 is configured to flow the particulate material from the storage tanks 26, through the metering systems 33, through the conduits 40, and through the pipes 42 generally along the longitudinal axis 37 for delivery to the agricultural implement.

During operation of the agricultural system (e.g., while the agricultural system is moving over the soil 21, moving over a roadway, being filled with the particulate material, dispensing the particulate material, or a combination thereof), portions of the air cart 12 may move with respect to one another and/or with respect to the ground (e.g., the soil 21, a roadway, etc.). For example, the storage tanks 26 and the coupled metering systems 33 may move within the air cart 12. Additionally, movement by a first storage tank 26 and a first metering system 33 may cause movement of a second storage tank 26 and a second metering system 33. Such movement may be substantially isolated and/or may be dissipated via the conduits 40. Each conduit 40 may include a substantially flexible portion that enable the conduits 40 to flex at a first end coupled to the metering system 33 or to the pipe 42. As such, the conduits 40 may flex at the first end to substantially isolate movement of the metering system 33 or of the pipe 42 and to at least partially prevent similar movement at a second end of the conduit 40 and/or the metering system 33 or the pipe 42 coupled to the second end. The flexing of the conduits 40, while maintaining the connections to the metering systems 33 or to the pipes 42, facilitates more accurate weighing and/or estimating of the agricultural product within the storage tanks 26.

Figure 3:
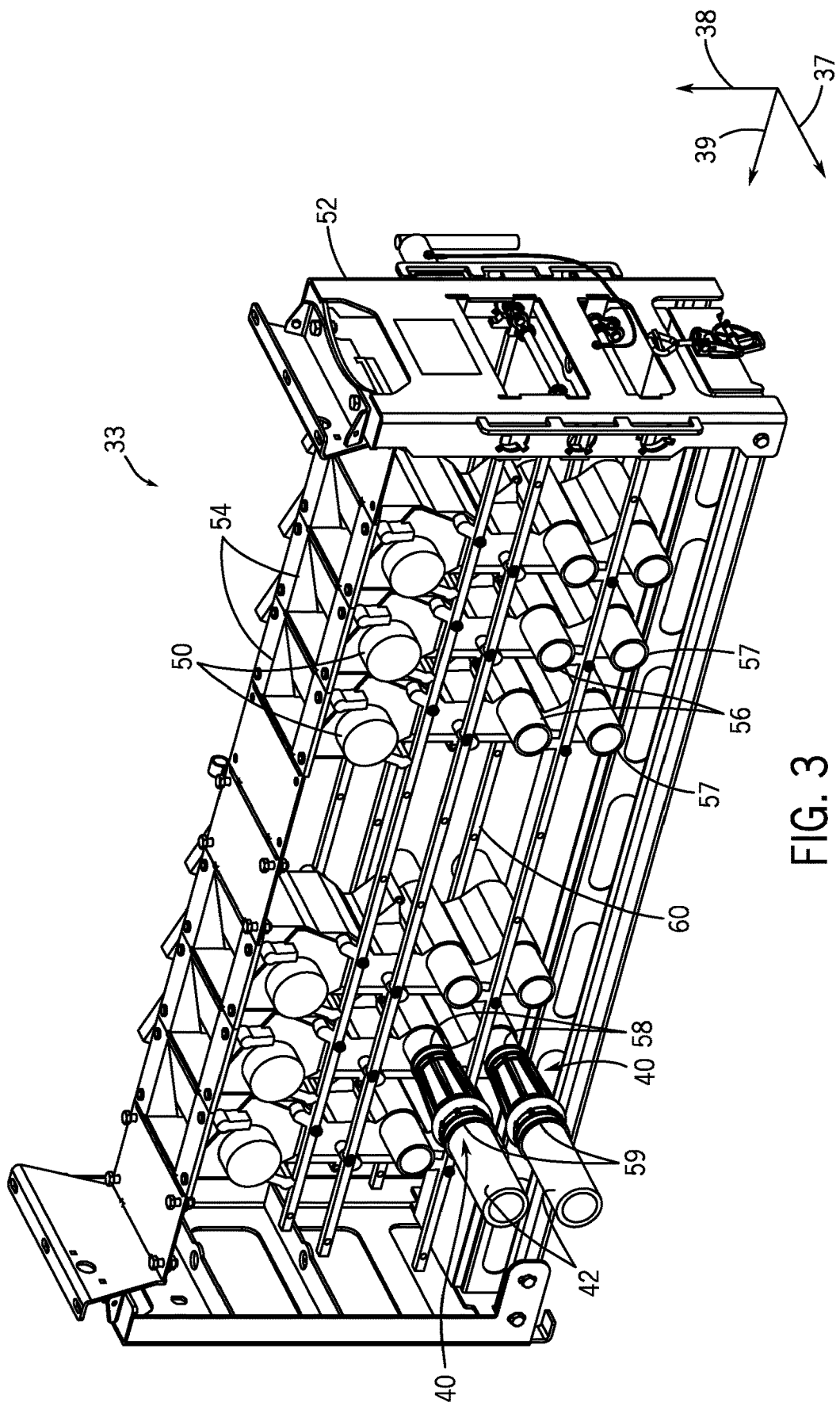
FIG. 3 is a perspective view of an embodiment of a metering system coupled to a conduit, in accordance with an aspect of the present disclosure.

FIG. 3 is a perspective view of an embodiment of the metering system 33 coupled to the conduits 40. As illustrated, the metering system 33 includes ten seed meters 50 supported by a frame 52. While the illustrated embodiment includes ten seed meters 50, more or fewer seed meters may be employed in alternative embodiments. For example, certain metering systems may include 1, 2, 4, 6, 8, 10, 12, 14, or more seed meters. In the illustrated embodiment, each seed meter 50 includes at least one respective metering device (e.g., meter roller) to control flow of particulate material to a respective conduit 40. Each seed meter 50 also includes an inlet 54 configured to receive the particulate material from the storage tank (e.g., along the vertical axis 38).

Furthermore, each seed meter 50 includes a first conduit connector 56 and a second conduit connector 57 (e.g., exit conduit connectors) configured to couple to the conduits 40. While two conduits 40 are illustrated, each of the first conduit connectors 56 and the second conduit connectors 57 may be coupled to a respective conduit 40. Additionally or alternatively, as described in greater detail below, each of the first conduit connectors 56 and the second conduit connectors 57 may be coupled to a conduit assembly. Each conduit connector 56 and 57 is configured to receive the air/material mixture (e.g., the particulate material metered by the seed meters 50 and mixed with the air flow).

As illustrated, the conduits 40 are coupled to exits of the first conduit connector 56 and the second conduit connector 57. As such, the air/material mixture may exit the metering system 33 by flowing through the conduits 40. Additionally, as illustrated, each of the conduits 40 include a first end 58 coupled to the metering system 33 and a second end 59 configured to couple to the pipe 42. The first end 58 includes a smaller diameter relative to the second end 59 such that the conduits 40 are tapered along the longitudinal axis 37 from the first end 58 to the second end 59 (e.g., the diameter of the conduits 40 expands along the longitudinal axis 37). The tapering of the conduits 40 causes the venturi effect that decelerates the air or the air/material mixture flowing through the conduit 40 after exiting the metering system 33.

In certain embodiments, the agricultural system described herein may include the conduits or the conduit assemblies coupled to inlet conduit connectors (e.g., on an opposite side of the metering system 33 relative to the conduits 40) and substantially similar to the conduits 40. As such, the particulate material may enter the metering system 33 by flowing through the conduits. Additionally, the first end having the smaller diameter may be coupled to the metering system 33 (e.g., to the inlet conduit connectors), and the second end having the larger diameter may be coupled to the pipe. The air or the air/material mixture may flow through the conduit and enter the metering system 33. The tapering of the conduit (e.g., the narrowing diameter of the conduit from the second end to the first end) may cause the venturi effect that accelerates the air or the air/material mixture flowing through the conduit prior to entering the metering system 33.

Furthermore, the metering system 33 includes a linkage 60 coupled to gates at each seed meter 50 that enables selection of the first conduit connector 56 or the second conduit connector 57 adjacent to each seed meter 50. Once the first conduit connector 56 or the second conduit connector 57 is selected, the air/material mixture flows through the selected conduit connector and to the conduit 40. As such, the particulate material may flow from the storage tank, through the metering system 33 (e.g., through the inlet 54, through the seed meter 50, through the first conduit connector 56 or through the second conduit connector 57), through the conduit 40, and through the pipes coupled to the conduits 40. Additionally or alternatively, the air or the air/material mixture may flow through a first conduit (e.g., the inlet conduit), enter the inlet conduit connectors, mix with the particulate material received from the metering system 33, exit the first conduit connector 56 or the second conduit connector 57, and flow through a second conduit (e.g., an exit conduit and/or the conduit 40).

Figure 4:
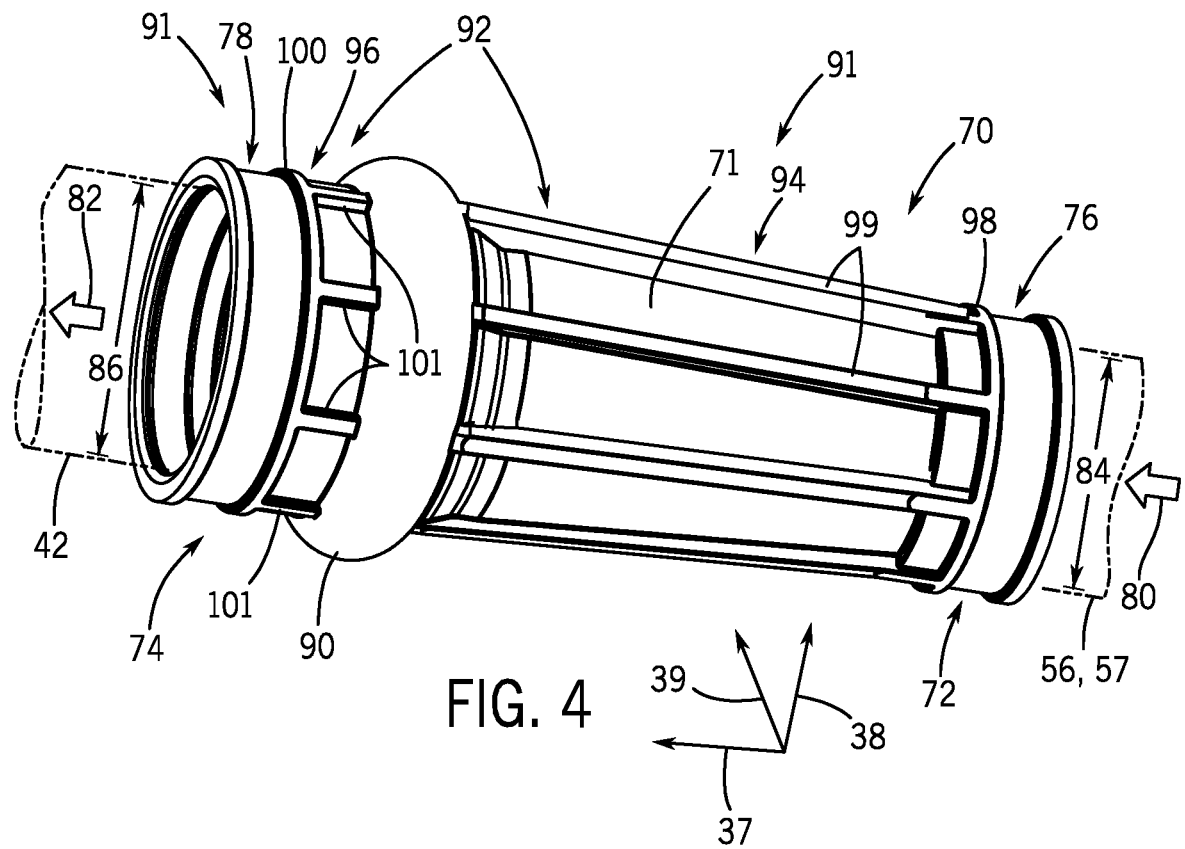
FIG. 4 is a perspective view of an embodiment of a conduit that may be coupled to the metering system of FIG. 3, in accordance with an aspect of the present disclosure.

FIG. 4 is a perspective view of an embodiment of a conduit 70 that may be coupled to the metering system of FIG. 3. The conduit 70 includes a body 71 having a first end 72 configured to couple to the first conduit connector 56 or to the second conduit connector 57 of the metering system and a second end 74 configured to couple to the pipe 42. The first end 72 includes a groove 76 for securing the conduit 70 to the first conduit connector 56 or to the second conduit connector 57. For example, the first conduit connector 56 or the second conduit connector 57 may insert into the first end 72, and a first clamp (e.g., a band clamp, a gear clamp, etc.) may be disposed generally around the conduit 70 at the groove 76 and tightened to secure the conduit 70 to the conduit connector 56 or 57. Additionally, the second end 74 includes a groove 78 for securing the conduit 70 to the pipe 42. For example, the pipe 42 may insert into the second end 74 and a second clamp may be disposed generally around the conduit 70 at the groove 78 and tightened to secure the conduit to the pipe 42. In certain embodiments, the conduit 70 may be coupled to the conduit connectors 56 or 57 and/or to the pipe 42 via other suitable mechanisms (e.g., via press fit connections, vacuum pressure, etc.).

As indicated by arrows 80 and 82, the conduit 70 is configured to flow the air or the air/material mixture from the first conduit connector 56 or from the second conduit connector 57 and to the pipe 42 along the longitudinal axis 37. As such, the conduit 70 may be an exit conduit configured to flow the air or the air/material mixture exiting the metering system. However, in certain embodiments, the flow of the air or of the air/material mixture may be reversed such that the conduit 70 may be an inlet conduit configured to flow the air or the air/material mixture entering the metering system.

The first end 72 includes a diameter 84 that is generally smaller than a diameter 86 of the second end 74 (e.g., interior diameters of the ends 72 and 74). The conduit 70 is generally tapered such that the diameter of the conduit 70 increases from the first end 72 to the second end 74. The tapering and increasing diameter along the flow path of the air or of the air/material mixture may cause the venturi effect that decelerates the air or the air/material mixture exiting the metering system. In embodiments with the flow reversed (e.g., with the conduit 70 positioned as an inlet conduit and coupled to the inlet of the metering system), the tapering may accelerate the air or the air/material mixture.

As illustrated, the conduit 70 includes a bellow 90 configured to flex (e.g., compress, extend, bend, etc.) to enable the second end 74 of the conduit 70 to move with respect to the first end 72 and with respect to the metering system. Additionally or alternatively, the bellow 90 may be configured to enable the first end 72 to move with respect to the second end 74 and the pipe 42. For example, the first end 72 and the second end 74 may move between 4 degrees and 5 degrees, between 5 degrees and 6 degrees, between 6 degrees and 8 degrees, between 8 degrees and 10 degrees, or between 10 degrees and 12 degrees with respect to one another. As such, the bellow 90 is configured to substantially isolate movement of the metering system and the pipe 42 with respect to one another and enables the conduit 70 to flex. The bellow 90 is generally semi-circular and extends outward from the body 71 of the conduit 70. In certain embodiments, the bellow may be disposed elsewhere along the conduit. For example, the bellow may be disposed adjacent to the first end of the conduit coupled to the metering system.

In some embodiments, the conduit may include other flexible elements (e.g., in addition to or in place of the bellow 90) that may include flexible geometries, materials, etc. and that may perform similar functions compared the bellow 90. For example, the conduit may include a mesh structure instead of or in addition to the bellow 90, and the mesh structure may enable the conduit to flex.

As illustrated, the conduit 70 includes a substantially rigid portion 91 that extends generally along the longitudinal axis 37 and that substantially rigidly supports the conduit 70. As illustrated, the substantially rigid portion 91 includes ribs 92 that substantially rigidly support the conduit 70. In certain embodiments, the ribs 92 may be omitted from the substantially rigid portion 91. The ribs 92 include a first rib portion 94 and a second rib portion 96. The first rib portion 94 extends from the first end 72 (e.g., from the groove 76) to the bellow 90, and the second rib portion 96 extends from the bellow 90 to the second end 74 (e.g., to the groove 78). The first rib portion 94 includes a circumferential rib 98 that substantially rigidly supports the conduit 70 about a circumference of the conduit 70 and longitudinal ribs 99 that substantially rigidly support the conduit 70 about the longitudinal axis 37. The second rib portion 96 includes a circumferential rib 100 that substantially rigidly supports the conduit 70 about a circumference of the conduit 70 and longitudinal ribs 101 that substantially rigidly support the conduit 70 about the longitudinal axis 37. As such, the conduit 70 includes the bellow 90 that enables the conduit 70 to flex (e.g., enables the first end 72 to move relative to the second end 74) and the substantially rigid portion 91 (e.g., the ribs 92) that substantially rigidly supports the conduit between the first end 72 and the bellow 90 and between the bellow 90 and the second end 74. Thus, the conduit 70 may flex while substantially rigidly maintaining connections with the conduit connectors 56 and 57 and with the pipe 42.

The conduit 70 may be formed from one or from multiple materials (e.g., rubber, plastic, metal, etc.). For example, the body 71, the bellow 90, and the ribs 92 may each be a different material, two of the body 71, the bellow 90, and the ribs 92 may be the same material, or each of the body 71, the bellow 90, and the ribs 92 may be the same material. In certain embodiments, the conduit 70 may be formed by an injection molding process or by an overmolding process. Additionally or alternatively, the conduit 70 may be a single piece or may include multiple pieces/components (e.g., may be a conduit assembly).

Figure 5:
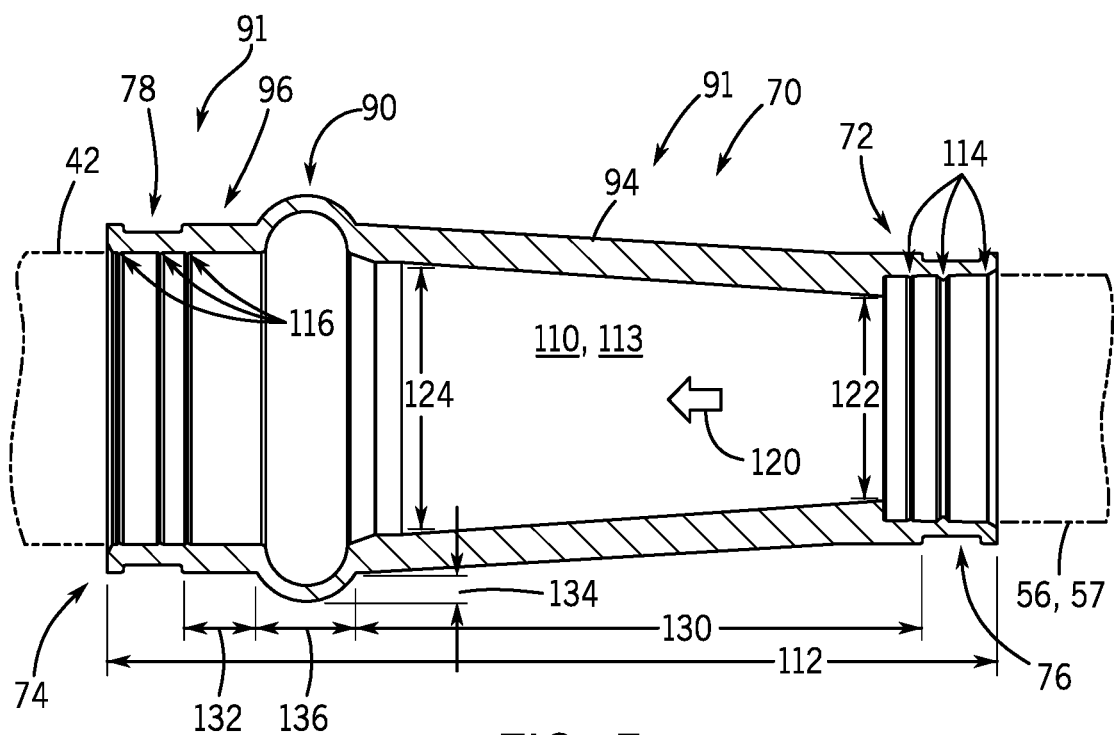
FIG. 5 is a side cross-sectional view of the conduit of FIG. 4, in accordance with an aspect of the present disclosure.

FIG. 5 is a side cross-sectional view of the conduit 70 of FIG. 4. The conduit 70 includes an interior 110 that extends from the first end 72 to the second end 74. As illustrated, a length 112 of the conduit 70 and of the interior 110 is about 8 inches. In other embodiments, the length of the conduit 70 may be longer or shorter (e.g., 3 inches, 6 inches, 9 inches, 12 inches, etc.). The conduit 70 is configured to receive the first conduit connector 56 or the second conduit connector 57 at the first end 72 and within the interior 110. As illustrated, the first conduit connector 56 or the second conduit connector 57 extend into the first end 74 of the conduit 70 up to a flow section 113. In certain embodiments, the conduit connector 56 or 57 may extend into the flow section 113 of the conduit 70. Additionally, the conduit 70 is configured to receive the pipe 42 at the second end 74 and within the interior 110. As illustrated, the pipe 42 extends into the second end 74 of the conduit 70 up to the bellow 90. In certain embodiments, the pipe 42 may extend at least partially within the bellow 90 or past the bellow 90 and up to the flow section 113.

Additionally, the conduit 70 includes a first set of sealing rings 114 and a second set of sealing rings 116 at the first end 72 and at the second end 74, respectively, within the interior 110. The first set of sealing rings 114 are configured to seal the connection between the conduit 70 and the first conduit connector 56 or the second conduit connector 57 (e.g., the first set of sealing rings 114 form and substantially maintain a seal between the interior 110 and an exterior of the conduit connector 56 or 57). The second set of sealing rings 116 are configured to seal the connection between the conduit 70 and the pipe 42 (e.g., the second set of sealing rings 116 form and substantially maintain a seal between the interior 110 and an exterior of the pipe 42). While each of the first set of sealing rings 114 and the second set of sealing rings 116 include three sealing rings, other embodiments of the conduit may include more or fewer sealing rings.

The conduit 70 is configured to flow the air or the air/material mixture through the interior 110 and through the flow section 113 generally from the first end 72 to the second end 74, as indicated by an arrow 120. A first interior diameter 122 of the flow section 113 is smaller than a second interior diameter 124 of the flow section 113. The increasing diameter of the flow section 113 along the flow path decelerates the air or the air/material mixture within the conduit 70 (e.g., the venturi effect). As illustrated, the first interior diameter 122 is about 1½ inches, and the second interior diameter 124 is about 2½ inches. However, in certain embodiments, the first interior diameter and/or the second interior diameter may be larger or smaller. In some embodiments, the bellow 90 may produce turbulence within the conduit 70 that facilitates mixing the air and the material within the flow through the conduit 70. For example, as the air/material mixture passes by the bellow 90 within the conduit 70, the increased diameter of the bellow 90 with respect to the body 71 may cause turbulence within the mixture that facilitates mixing of the air and the material within the mixture.

As illustrated, a length 130 of the first rib portion 94 is about 6 inches, and a length 132 of the second rib portion 96 is about ½ inch. In certain embodiments, the lengths of the first rib portion 94 and/or of the second rib portion 96 may be longer or shorter. Further, as illustrated, a height 134 of the bellow 90 (e.g., extending outwardly from the body 71 of the conduit 70) is about ¼ inch, and a length 136 of the bellow 90 (e.g., extending longitudinally) is about 1 inch. In certain embodiments, the height and/or the length of the bellow 90 may be longer or shorter.

Figure 6:
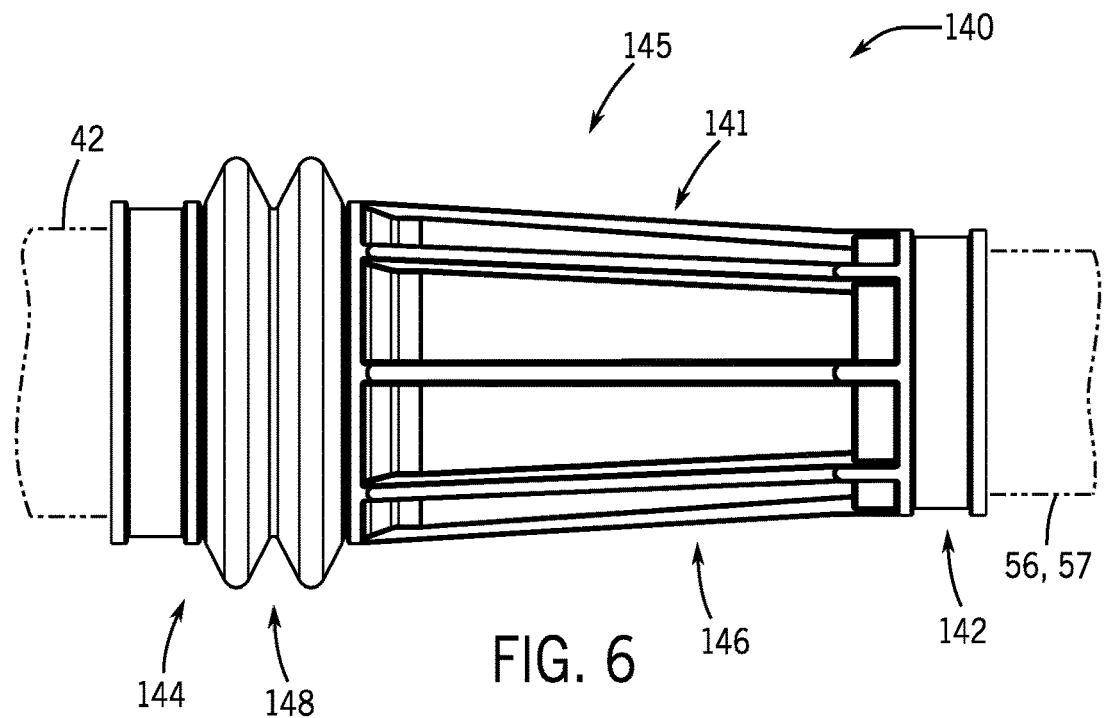
FIG. 6 is a side view of an embodiment of a conduit that may be coupled to the metering system of FIG. 3, in accordance with an aspect of the present disclosure.

FIG. 6 is a side view of an embodiment of a conduit 140 that may be coupled to the metering system of FIG. 3. As illustrated, the conduit 140 includes a body 141 extending from a first end 142 to a second end 144. The conduit 140 is configured to couple to the conduit connector 56 or 57 at the first end 142 and to the pipe 42 at the second end 144. The conduit 140 is configured to be disposed at an inlet of the metering system (e.g., to flow the air or the air/material mixture from the second end 144 to the first end 142) or at an outlet of the metering system (e.g., to flow the air or the air/material mixture from the first end 142 to the second end 144). Additionally, the conduit 140 includes a substantially rigid portion 145, which includes ribs 146, and bellows 148. The substantially rigid portion 145 (e.g., the ribs 146) extends generally from the first end 142 to the bellows 148 and is configured to substantially rigidly support the conduit 140. In some embodiments, the ribs 146 may be omitted from the substantially rigid portion 145. The bellows 148 extend generally from the substantially rigid portion 145 to the second end 144 and are configured to enable the conduit 140 to flex to substantially isolate movement of the pipe 42 and the conduit connector 56 or 57 (e.g., the metering system) with respect to one another.

Figure 7:
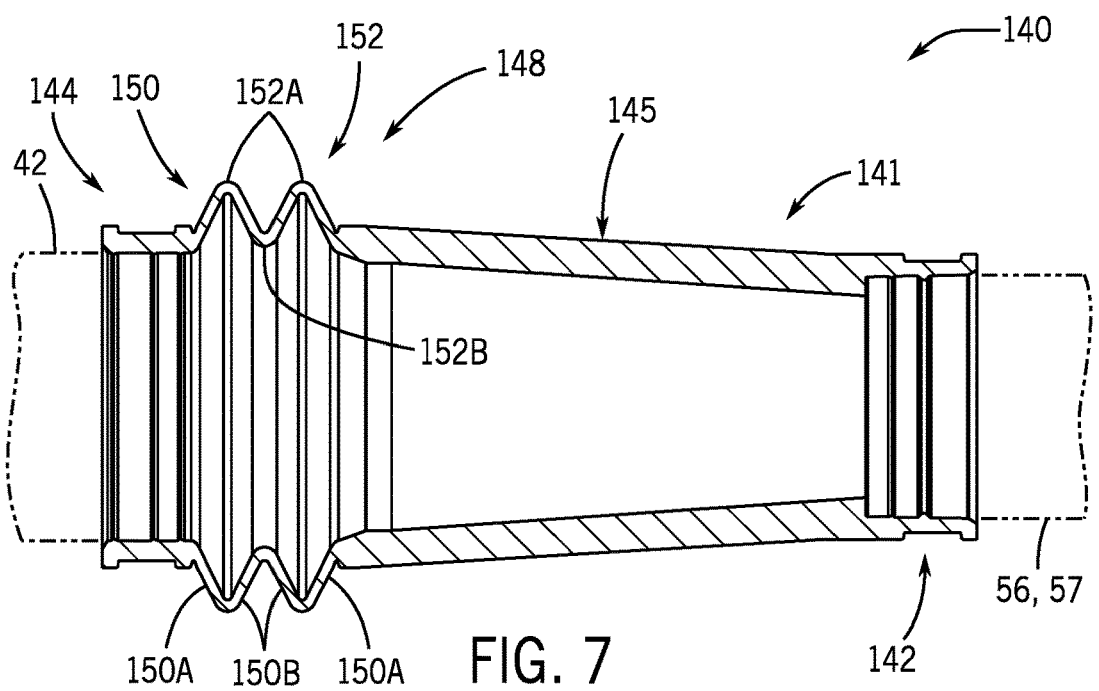
FIG. 7 is a side cross-sectional view of the conduit of FIG. 6, in accordance with an aspect of the present disclosure.

FIG. 7 is a side cross-sectional view of the conduit 140 of FIG. 6. As illustrated, the conduit 140 includes two bellows 148. In certain embodiments, the conduit 140 may include more or fewer bellows 148. The bellows 148 include straight portions 150 and curved portions 152. A first straight portion 150A of each bellow 148 is coupled to the body 141 of the conduit 140 and to a curved portion 152A. A second straight portion 150B is coupled to the curved portion 152A and to a middle curved portion 152B. As the bellows 148 flex (e.g., compress, extend, bend, etc.) to enable movement of the first end 142 with respect to the second end 144, each of the straight portions 150 are configured to remain substantially straight and to move with respect to one another, and the curved portions 152 are configured to flex. As illustrated, the bellows 148 are generally equal in diameter. In certain embodiments, each bellow or some bellows may be have a different diameter compared to other bellows.

Figure 8:
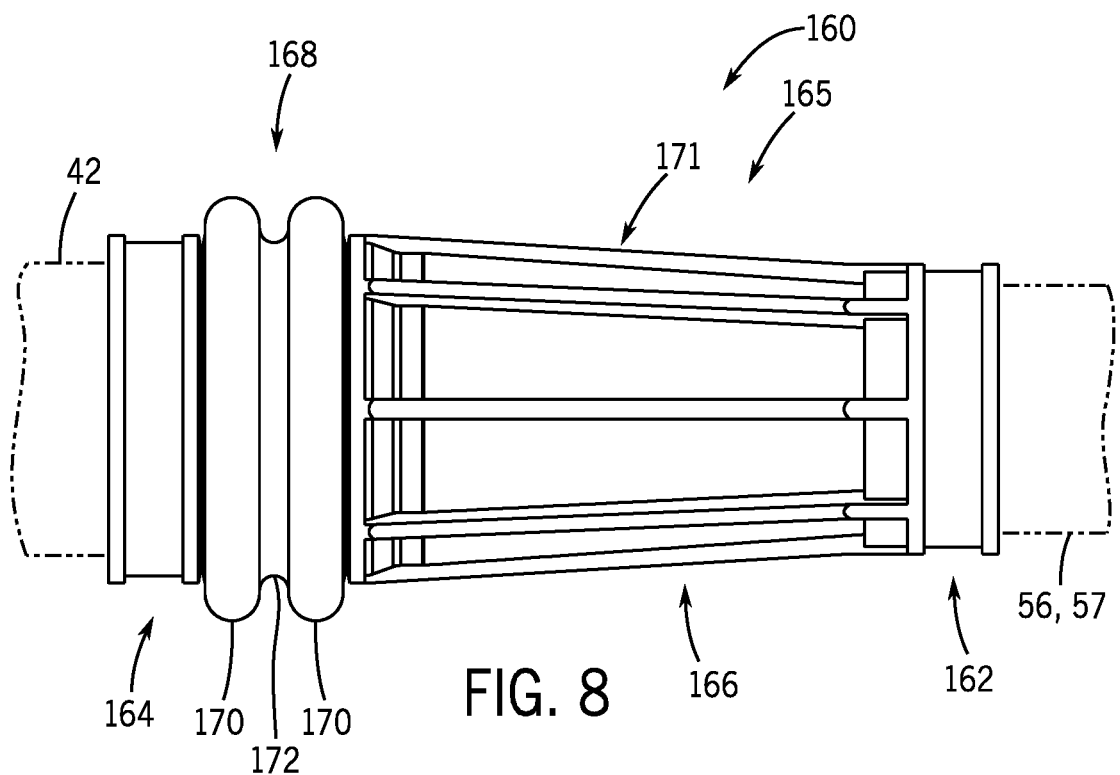
FIG. 8 is a side view of an embodiment of a conduit that may be coupled to the metering system of FIG. 3, in accordance with an aspect of the present disclosure.

FIG. 8 is a side view of an embodiment of a conduit 160 that may be coupled to the metering system of FIG. 3. As illustrated, the conduit 160 includes a body 171 extending from a first end 162 to a second end 164. The conduit 160 is configured to couple to the conduit connector 56 or 57 at the first end 162 and to the pipe 42 at the second end 164. The conduit 160 is configured to be disposed at an inlet of the metering system (e.g., to flow the air or the air/material mixture from the second end 164 to the first end 162) or at an outlet of the metering system (e.g., to flow the air or the air/material mixture from the first end 162 to the second end 164). Additionally, the conduit 160 includes a substantially rigid portion 165, which includes ribs 166, and bellows 168. The substantially rigid portion 165 (e.g., the ribs 166) extends generally from the first end 162 to the bellows 168 and is configured to substantially rigidly support the conduit 160. In some embodiments, the ribs 166 may be omitted from the substantially rigid portion 165. The bellows 168 extend generally from the substantially rigid portion 165 to the second end 164 and are configured to enable the conduit 160 to flex to substantially isolate movement of the pipe 42 and the conduit connector 56 or 57 (e.g., the metering system) with respect to one another. As illustrated, the bellows 168 include circular outer sections 170 and a circular inner section 172. Each of the circular outer sections 170 are coupled to the body 171 and to the circular inner section 172. As the bellows 168 flex (e.g., compress, extend, bend, etc.) to enable movement of the first end 162 with respect to the second end 164, each of the circular outer sections 170 and the circular inner section 172 are configured to flex and/or are configured to move with respect to one another.

Figure 9:
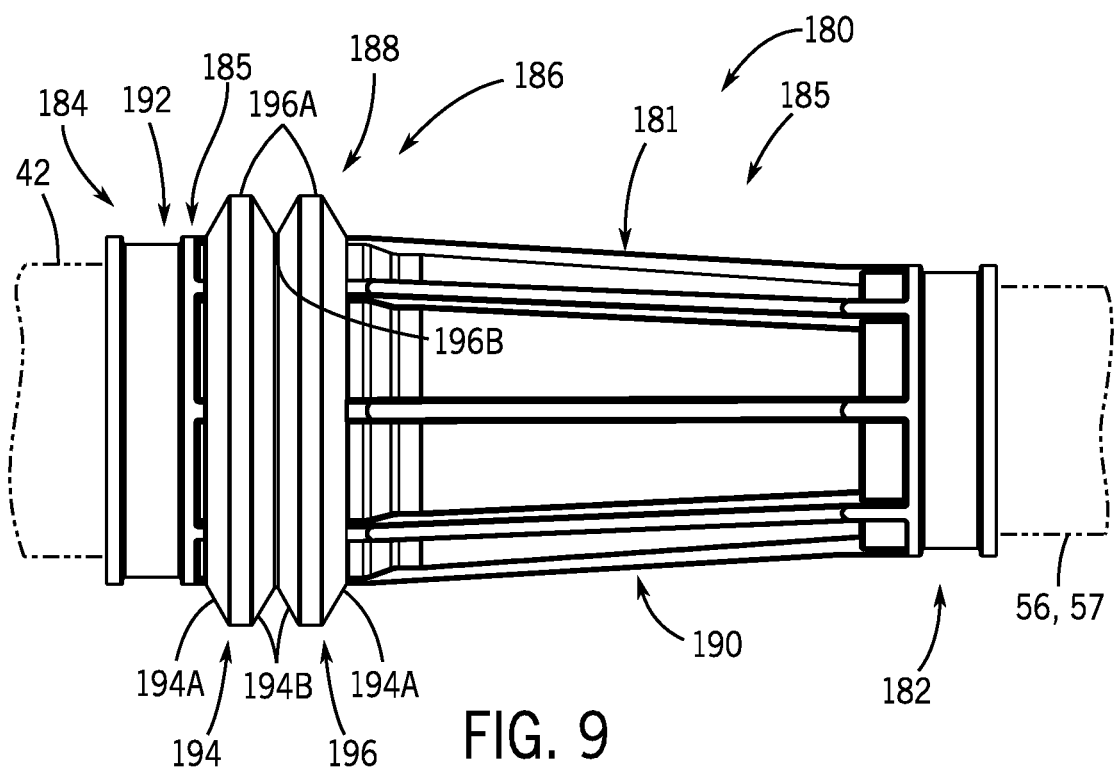
FIG. 9 is a side view of an embodiment of a conduit that may be coupled to the metering system of FIG. 3, in accordance with an aspect of the present disclosure.

FIG. 9 is a side view of an embodiment of a conduit 180 that may be coupled to the metering system of FIG. 3. As illustrated, the conduit 180 includes a body 181 extending from a first end 182 to a second end 184. The conduit 180 is configured to couple to the conduit connector 56 or 57 at the first end 182 and to the pipe 42 at the second end 184. The conduit 180 is configured to be disposed at an inlet of the metering system (e.g., to flow the air or the air/material mixture from the second end 184 to the first end 182) or at an outlet of the metering system (e.g., to flow the air or the air/material mixture from the first end 182 to the second end 184). Additionally, the conduit 180 includes a substantially rigid portion 185, which includes ribs 186, and bellows 188. The substantially rigid portion 185 (e.g., the ribs 186) is configured to substantially rigidly support the conduit 180 and includes a first rib portion 190 extending generally from the first end 182 to the bellows 188 and a second rib portion 192 extending from the bellows 168 to the second end 184. In some embodiments, the ribs 186 may be omitted from the substantially rigid portion 185. The bellows 188 extend generally from the substantially rigid portion 185 to the second end 184 and are configured to enable the conduit 180 to flex to substantially isolate movement of the pipe 42 and the conduit connector 56 or 57 (e.g., the metering system) with respect to one another. As illustrated, the bellows 188 include angled portions 194 and parallel portions 196. A first angled portion 194A of each bellow 188 is coupled to the body 181 of the conduit 180 and to a parallel portion 196A. A second angled portion 194B is coupled to the parallel portion 196A and to a middle parallel portion 196B. As the bellows 188 flex (e.g., compress, extend, bend, etc.) to enable movement of the first end 182 with respect to the second end 184, each of the angled portions 194 are configured to move with respect to one another and with respect to the parallel portions 196. The parallel portions 196 may remain generally parallel to the body 181 as the bellows 188 flex.

Figure 10:
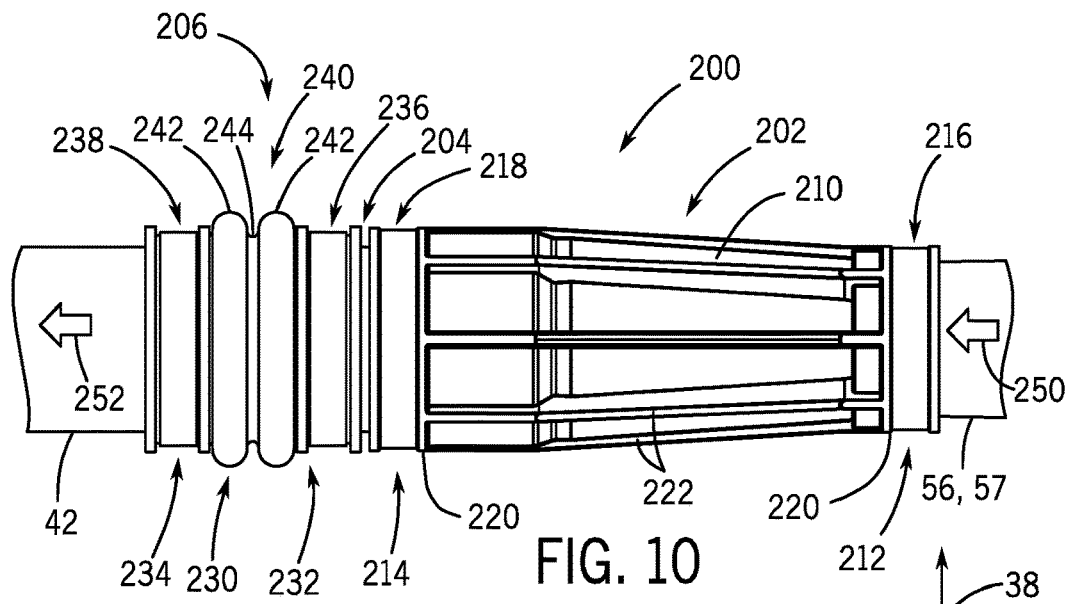
FIG. 10 is a side view of an embodiment of a conduit assembly that may be coupled to the metering system of FIG. 3, in accordance with an aspect of the present disclosure.

FIG. 10 is a side view of an embodiment of a conduit assembly 200 that may be coupled to the metering system of FIG. 3. As illustrated, the conduit assembly 200 includes a substantially rigid conduit 202, a connecting conduit 204, and a substantially flexible conduit 206. The substantially rigid conduit 202 includes a body 210 having a first end 212 configured to couple to the first conduit connector 56 or to the second conduit connector 57 of the metering system and a second end 214 configured to couple to the connecting conduit 204. The first end 212 includes a groove 216 for securing the substantially rigid conduit 202 to the first conduit connector 56 or to the second conduit connector 57. For example, the first conduit connector 56 or the second conduit connector 57 may insert into the first end 212, and a first clamp (e.g., a band clamp, a gear clamp, etc.) may be disposed generally around the substantially rigid conduit 202 at the groove 216 and tightened to secure the substantially rigid conduit 202 to the conduit connector 56 or 57. Additionally, the second end 214 includes a groove 218 for securing the substantially rigid conduit 202 to the connecting conduit 204. For example, the connecting conduit 204 may be inserted into the second end 214 and a second clamp may be disposed generally around the substantially rigid conduit 202 at the groove 218 and tightened to secure the conduit to the connecting conduit 204. In certain embodiments, the substantially rigid conduit 202 may be coupled to the conduit connectors 56 or 57 and/or to the connecting conduit 204 via other suitable mechanisms (e.g., via press fit connections, vacuum pressure, etc.).

The substantially rigid conduit 202 also includes circumferential ribs 220 disposed at the first end 212 adjacent to the groove 216 and at the second end 214 adjacent to the groove 218. Further, the substantially rigid conduit 202 includes longitudinal ribs 222 extending longitudinally along the body 210 between the circumferential ribs 220 (e.g., between the first end 212 and the second end 214). The ribs 220 and 222 substantially rigidly support the substantially rigid conduit 202 and enable the substantially rigid conduit 202 to remain substantially rigid during operation of the agricultural system. In certain embodiments, the circumferential ribs 220 and/or the longitudinal ribs 222 may be omitted from the substantially rigid conduit 202.

The connecting conduit 204 includes a cylinder that extends into the substantially rigid conduit 202 and into the substantially flexible conduit 206. The connecting conduit 204 forms a continuous flow path for the air or the air/material mixture flowing through the substantially rigid conduit 202 and through the substantially flexible conduit 206.

The substantially flexible conduit 206 includes a body 230 having a first end 232 configured to couple to the connecting conduit 204 and a second end 234 configured to couple to the pipe 42. The first end 232 includes a groove 236 for securing the substantially rigid conduit 202 to the connecting conduit 204. For example, the connecting conduit 204 may insert into the first end 232, and a first clamp (e.g., a band clamp, a gear clamp, etc.) may be disposed generally around the substantially flexible conduit 206 at the groove 236 and tightened to secure the substantially flexible conduit 206 to the connecting conduit 204. Additionally, the second end 234 includes a groove 238 for securing the substantially connecting conduit 204 to the pipe 42. For example, the pipe 42 may be inserted into the second end 234 and a second clamp may be disposed generally around the substantially connecting conduit 204 at the groove 238 and tightened to secure the conduit to the pipe 42. In certain embodiments, the substantially rigid conduit 202 may be coupled to the connecting conduit 204 and to the pipe 42 via other suitable mechanisms (e.g., via press fit connections, vacuum pressure, etc.).

As illustrated, the substantially flexible conduit 206 includes bellows 240 configured to flex (e.g., compress, extend, bend, etc.) to enable the conduit assembly 200 to flex and to enable the conduit assembly 200 to substantially isolate movement of the metering system and the pipe 42 with respect to one another. For example, the first end 232 and the second end 234 may move between 4 degrees and 5 degrees, between 5 degrees and 6 degrees, between 6 degrees and 8 degrees, between 8 degrees and 10 degrees, or between 10 degrees and 12 degrees with respect to one another. As illustrated, the bellows 240 include two generally semi-circular bellows 242 that extend outwardly from the body 230 of the substantially flexible conduit 206. The semi-circular bellows 242 are connected by a connecting portion 244. As the bellows 240 flex, one or both of the semi-circular bellows 242 and/or the connecting portion 244 may compress, extend, bend, or a combination thereof In some embodiments, the substantially flexible conduit may include other flexible elements (e.g., in addition to or in place of the bellows 240) that may include flexible geometries, materials, etc. and that may perform similar functions compared the bellows 240. For example, the substantially flexible conduit may include a mesh structure instead of or in addition to the bellows 240, and the mesh structure may enable the substantially flexible conduit to flex.

As indicated by arrows 250 and 252, the conduit assembly 200 is configured to flow the air or the air/material mixture from the first conduit connector 56 or from the second conduit connector 57 and to the pipe 42 along the longitudinal axis 37. As such, the conduit assembly 200 may be an exit conduit assembly configured to flow the air or the air/material mixture exiting the metering system. However, in certain embodiments, the flow of the air or of the air/material mixture may be reversed such that the conduit assembly 200 may be an inlet conduit assembly configured to flow the air or the air/material mixture entering the metering system.

As such, the conduit assembly 200 includes the substantially flexible conduit 206 that enables the conduit assembly 200 to flex (e.g., enables the metering system and the pipe 42 to move relative to one another) and the substantially rigid conduit 202 that substantially rigidly supports the conduit assembly 200 between the conduit connector 56 or 57 and the connecting conduit 204. Thus, the conduit assembly 200 may flex while substantially rigidly maintaining connections with the conduit connectors 56 and 57 and with the pipe 42.

Figure 11:
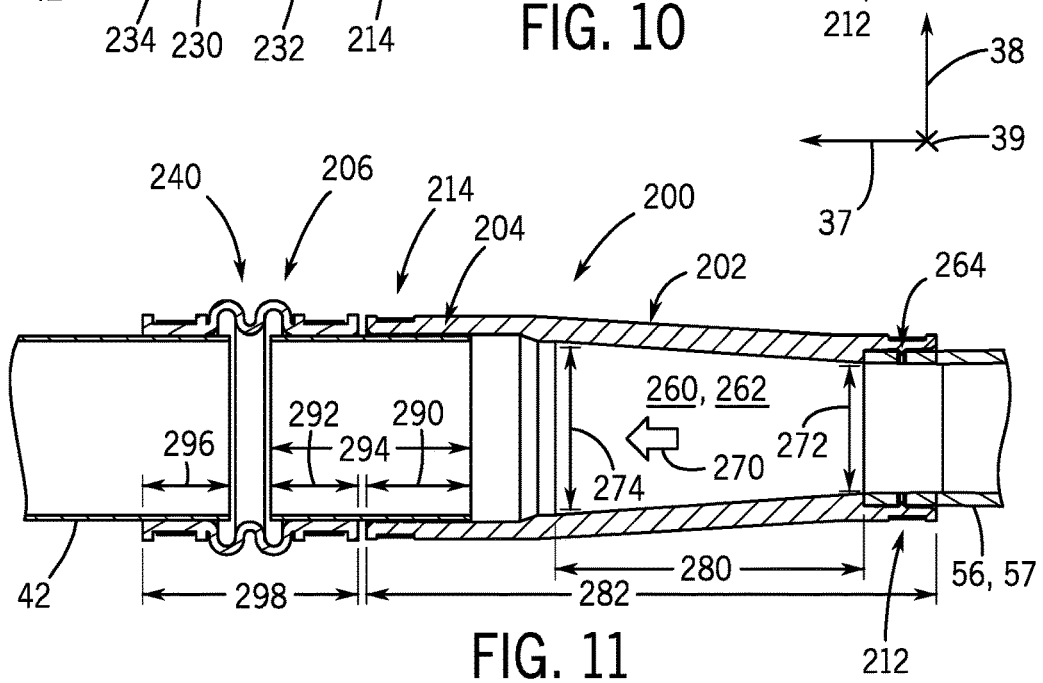
FIG. 11 is a side cross-sectional view of the conduit assembly of FIG. 10, in accordance with an aspect of the present disclosure.

FIG. 11 is a side cross-sectional view of the conduit assembly 200 of FIG. 10. As described above, the conduit assembly 200 includes the substantially rigid conduit 202, the connecting conduit 204, and the substantially flexible conduit 206. The substantially rigid conduit 202 is configured to receive the first conduit connector 56 or the second conduit connector 57 at the first end 212 and within an interior 260. As illustrated, the first conduit connector 56 or the second conduit connector 57 extend into the first end 212 of the conduit 70 up to a flow section 262. In certain embodiments, the conduit connector 56 or 57 may extend into the flow section 262 of the substantially rigid conduit 202. Additionally, the substantially rigid conduit 202 is configured to receive the connecting conduit 204 at the second end 214 and within the interior 260. Additionally, the substantially rigid conduit 202 includes a sealing ring 264 at the first end 212 and within the interior 110. The sealing ring 264 is configured to seal the connection between the substantially rigid conduit 202 and the first conduit connector 56 or the second conduit connector 57 (e.g., the sealing ring 264 is configured to form and substantially maintain a seal between the interior 260 and an exterior of the conduit connector 56 or 57).

The substantially rigid conduit 202 is configured to flow the air or the air/material mixture through the interior 260 and through the flow section 262 generally from the first end 212 to the second end 214, as indicated by an arrow 270. A first interior diameter 272 of the flow section 262 adjacent to the first end 212 is smaller than a second interior diameter 274 of the flow section 262 adjacent to the second end 214. The increasing diameter of the flow section 262 along the flow path decelerates the air or the air/material mixture within the substantially rigid conduit 202 (e.g., the venturi effect). As illustrated, the first interior diameter 272 is about 1½ inches, and the second interior diameter 274 is about 2½ inches. Additionally, as illustrated, a length 280 of the flow section 262 is about 4 inches and a length 282 of the substantially rigid conduit 202 is about 6 inches. However, in certain embodiments, the first interior diameter 272, the second interior diameter 274, the length 280, the length 282, or a combination thereof may be larger or smaller.

The connecting conduit 204 is configured to flow the air or the air/material mixture from the substantially rigid conduit 202 to the substantially flexible conduit 206, or vice versa. The connecting conduit 204 extends into the second end 214 of the substantially rigid conduit 202 a first distance 290. Further, the connecting conduit 204 extends into the substantially flexible conduit 206 adjacent to the bellows 240 and a second distance 292. As illustrated, the first distance 290 is about 1 inch, and the second distance 292 is about 1 inch. Additionally, a length 294 of the connecting conduit is about 2 inches. However, in certain embodiments, the first distance 290, the second distance 292, the length 294, or a combination thereof may be larger or smaller.

The substantially flexible conduit 206 is configured to flex to enable the conduit assembly 200 to flex and to enable the conduit assembly 200 to substantially isolate movement of the metering system and the pipe 42 with respect to one another. The pipe 42 extends into the substantially flexible conduit 206 a distance 296 and adjacent to the bellows 240. As illustrated, the distance 296 is about 1 inch. Additionally, a length 298 of the substantially flexible conduit 206 is about 2½ inches. However, in other embodiments, the distance 296 and/or the length 298 may be larger or smaller. As such, each of the connecting conduit 204 and the pipe 42 extend into the substantially flexible conduit 206 adjacent to the bellows 240.

As illustrated, the conduit assembly 200 is configured to flow the air or the air/material mixture generally from the conduit connector 56 or 57 to the pipe 42. As such, the conduit assembly 200 is configured to be an exit conduit assembly of the agricultural system described herein. In certain embodiments, the conduit assembly 200 may be configured to flow the air or the air/material mixture generally from the pipe 42 to the conduit connector 56 or 57. As such, the conduit assembly 200 may be configured as an inlet conduit assembly of the agricultural system described herein.

Figure 12:
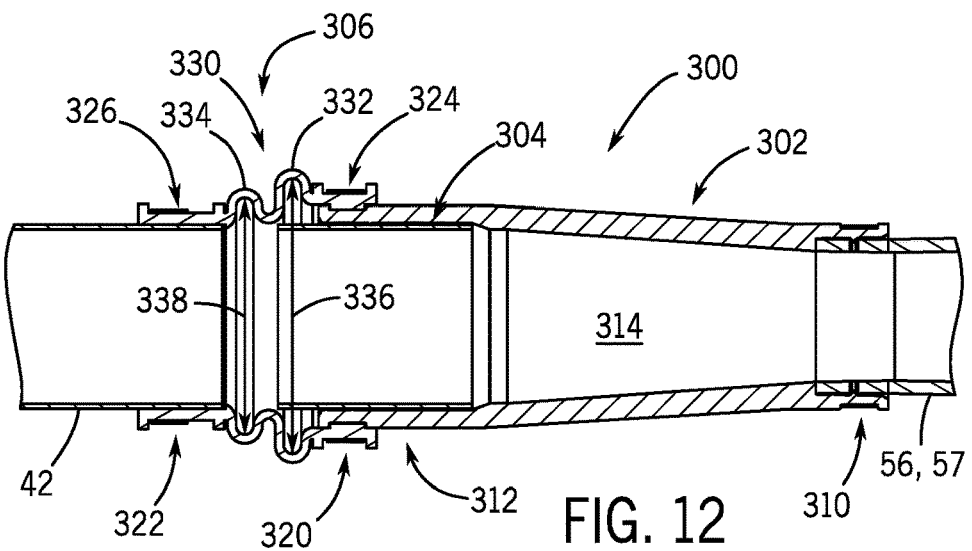
FIG. 12 is a side cross-sectional view of an embodiment of a conduit assembly that may be coupled to the metering system of FIG. 3, in accordance with an aspect of the present disclosure.

FIG. 12 is a side cross-sectional view of an embodiment of a conduit assembly 300 that may be coupled to the metering system of FIG. 3. The conduit assembly 300 includes a substantially rigid conduit 302, a connecting conduit 304, and a substantially flexible conduit 306. The substantially rigid conduit 302 is configured to receive the conduit connector 56 or 57 at a first end 310 and to receive the connecting conduit 304 at a second end 312. Each of the conduit connector 56 or 57 and the connecting conduit 304 extend into an interior 314 of the substantially rigid conduit 302. As such, the substantially rigid conduit 302 is configured to substantially rigidly maintain a connection between the conduit connector 56 or 57 and the connecting conduit 304.

The substantially flexible conduit 306 is configured to receive the substantially rigid conduit 302 and the connecting conduit 304 at a first end 320 and to receive the pipe 42 at a second end 322. The substantially flexible conduit 306 is coupled to the substantially rigid conduit 302 at a groove 324 and coupled to the pipe 42 at a groove 326. Additionally, the connecting conduit 304 extends into the second end 312 of the substantially rigid conduit 302 and into the first end 320 of the substantially flexible conduit 306. The substantially flexible conduit 306 includes bellows 330 that enable the conduit assembly 300 to flex and/or to substantially isolate movement of the pipe 42 and the metering system (e.g., the conduit connectors 56 or 57) relative to another. The bellows 330 include a first bellow 332 and a second bellow 334. The substantially rigid conduit 302 extends into the substantially flexible conduit 306 up to the first bellow 332, the connecting conduit 304 extends into the substantially flexible conduit 306 past the first bellow 332 and up to the second bellow 334, and the pipe 42 extends into the substantially flexible conduit 306 up to the second bellow 334. The first bellow 332 has a first diameter 336 that is larger than a second diameter 338 of the second bellow 334. For example, as illustrated, the first diameter 336 is about 3 inches, and the second diameter 338 is about 2½ inches. In certain embodiments, the first diameter 336 and/or the second diameter 338 may be generally equal, may be larger, may be smaller, or a combination thereof.

As illustrated, the conduit assembly 300 is configured to flow the air or the air/material mixture generally from the conduit connector 56 or 57 to the pipe 42. As such, the conduit assembly 300 is configured to be an exit conduit assembly of the agricultural system described herein. In certain embodiments, the conduit assembly 300 may be configured to flow the air or the air/material mixture generally from the pipe 42 to the conduit connector 56 or 57. As such, the conduit assembly 300 may be configured as an inlet conduit assembly of the agricultural system described herein.

Figure 13:
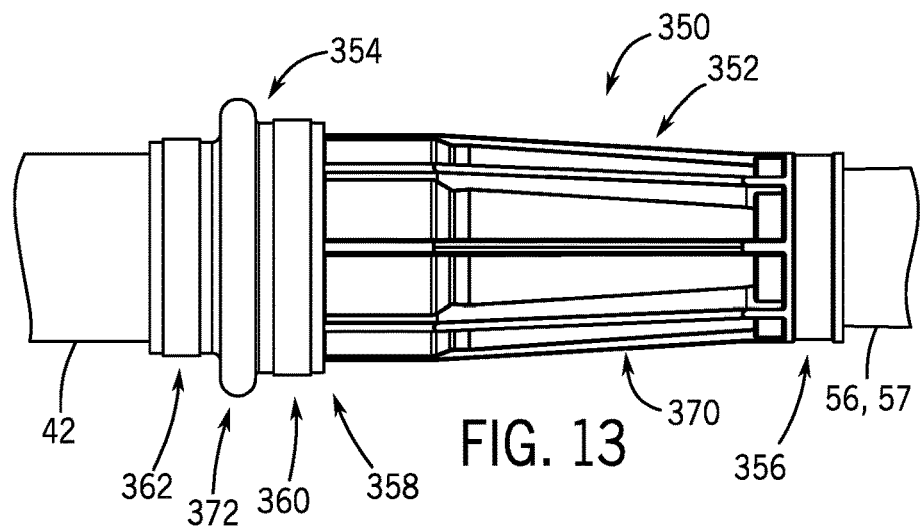
FIG. 13 is a side view of an embodiment of a conduit assembly that may be coupled to the metering system of FIG. 3, in accordance with an aspect of the present disclosure.

FIG. 13 is a side view of an embodiment of a conduit assembly 350 that may be coupled to the metering system of FIG. 3. The conduit assembly 350 includes a substantially rigid conduit 352 and a substantially flexible conduit 354. A first end 356 of the substantially rigid conduit 352 is configured to receive the conduit connector 56 or 57, and a second end 358 is configured to extend into a first end 360 of the substantially flexible conduit 354. Additionally, the substantially flexible conduit 354 includes a second end 362 configured to receive the pipe 42.

The substantially rigid conduit 352 includes ribs 370 configured to substantially rigidly support the substantially rigid conduit 352, and the conduit assembly 350 generally, both circumferentially and longitudinally. In certain embodiments, the ribs 370 may be omitted from the substantially rigid conduit 352. Additionally, the substantially flexible conduit 354 includes a bellow 372 configured to enable the substantially flexible conduit 354, and the conduit assembly 350 generally, to flex. Further, the bellow 372 enables the conduit assembly 350 to substantially isolate movement of the pipe 42 and the conduit connector 56 or 57 with respect to one another.

Figure 14:
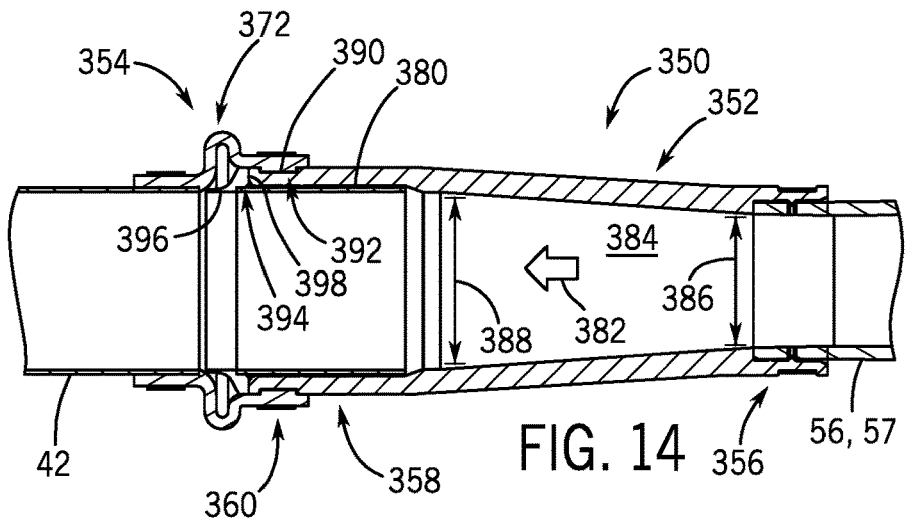
FIG. 14 is a side cross-sectional view of the conduit assembly of FIG. 13, in accordance with an aspect of the present disclosure.

FIG. 14 is a side cross-sectional view of the conduit assembly 350 of FIG. 13. The conduit assembly 350 includes the substantially rigid conduit 352, the substantially flexible conduit 354, and a connecting conduit 380. The connecting conduit 380 includes a cylinder that extends into the second end 358 of the substantially rigid conduit 352 and into the first end 360 of the substantially flexible conduit 354. As such, the connecting conduit 380 is configured to at least partially form a continuous flow path through the conduit assembly 350. For example, as indicated by arrow 382, the conduit assembly 350 is configured to flow the air or the air/material mixture generally from the conduit connector 56 or 57 to the pipe 42. As such, the conduit assembly 350 is configured to be an exit conduit assembly of the agricultural system described herein. Additionally, the substantially rigid conduit 352 includes a flow section 384 having a first diameter 386 at the first end 356 that is smaller than a second diameter 388 at the second end 358. As such, the increasing diameter of the flow section 384 along the flow path decelerates the air or the air/material mixture within the substantially rigid conduit 352 (e.g., the venturi effect).

In certain embodiments, the conduit assembly 350 may be configured to flow the air or the air/material mixture generally from the pipe 42 to the conduit connector 56 or 57. As such, the conduit assembly 350 may be configured as an inlet conduit assembly of the agricultural system described herein. The decreasing diameter of the flow section 384 along the flow path would decelerate the air or the air/material mixture flowing from the pipe 42 to the conduit connector 56 or 57.

As illustrated, the first end 360 of the substantially flexible conduit 354 is coupled to the second end 358 of the substantially rigid conduit 352 via an extension 390 extending from the first end 360 and into a groove 392 of the second end 358. The extension 390 may be secured to the groove 392 via a gear clamp, a band clamp, a press fit connection, vacuum pressure, or a combination thereof Additionally, the conduit assembly 350 includes a secondary connecting conduit 394 that extends generally between the substantially rigid conduit 352, the substantially flexible conduit 354, and the connecting conduit 380. The secondary connecting conduit 394 includes a flow portion 396 that substantially connects the flow path through the conduit assembly 350 between the connecting conduit 380 and the pipe 42. For example, the flow portion 396 substantially blocks the air or the air/material mixture from entering the bellow 372. The secondary connecting conduit 394 also includes a radial portion 398 that extends radially outward and between the connecting conduit 380 and the substantially flexible conduit 354.

Figure 15:
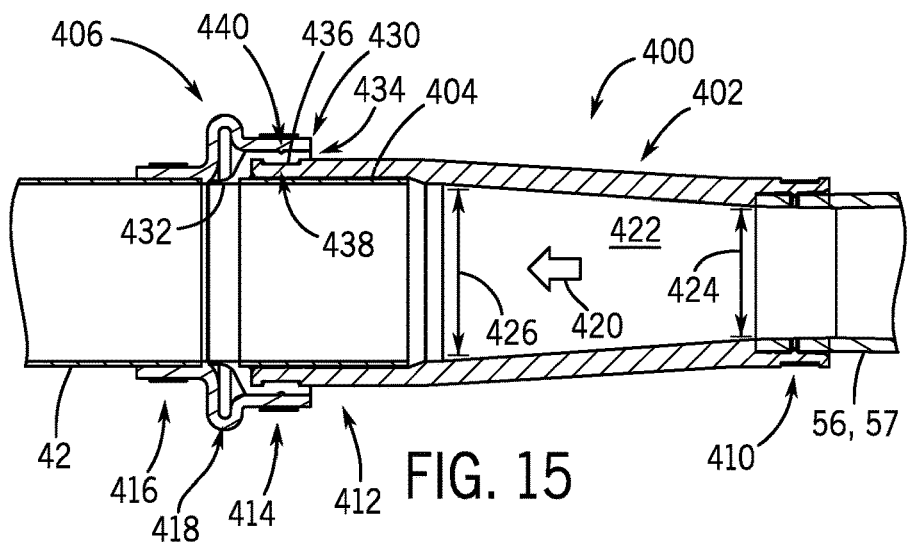
FIG. 15 is a side cross-sectional view of an embodiment of a conduit assembly that may be coupled to the metering system of FIG. 3, in accordance with an aspect of the present disclosure.

FIG. 15 is a side cross-sectional view of an embodiment of a conduit assembly 400 that may be coupled to the metering system of FIG. 3. The conduit assembly 400 includes a substantially rigid conduit 402, a connecting conduit 404, and a substantially flexible conduit 406. A first end 410 of the substantially rigid conduit 402 is configured to receive the conduit connector 56 or 57, and a second end 412 is configured to extend into a first end 414 of the substantially flexible conduit 406. Additionally, the substantially flexible conduit 406 includes a second end 416 configured to receive the pipe 42. The substantially flexible conduit 406 includes a bellow 418 that enables the conduit assembly 400 to flex and to substantially isolate movement of the pipe 42 and the conduit connector 56 or 57 with respect to one another. The connecting conduit 404 includes a cylinder that extends into the second end 412 of the substantially rigid conduit 402 and into the first end 414 of the substantially flexible conduit 406. As such, the connecting conduit 404 is configured to at least partially form a continuous flow path through the conduit assembly 400. For example, as indicated by arrow 420, the conduit assembly 400 is configured to flow the air or the air/material mixture generally from the conduit connector 56 or 57 to the pipe 42. As such, the conduit assembly 400 is configured to be an exit conduit assembly of the agricultural system described herein. Additionally, the substantially rigid conduit 402 includes a flow section 422 having a first diameter 424 at the first end 410 that is smaller than a second diameter 426 at the second end 412. As such, the increasing diameter of the flow section 422 along the flow path decelerates the air or the air/material mixture within the substantially rigid conduit 402 (e.g., the venturi effect).

In certain embodiments, the conduit assembly 400 may be configured to flow the air or the air/material mixture generally from the pipe 42 to the conduit connector 56 or 57. As such, the conduit assembly 400 may be configured as an inlet conduit assembly of the agricultural system described herein. The decreasing diameter of the flow section 422 along the flow path would decelerate the air or the air/material mixture flowing from the pipe 42 to the conduit connector 56 or 57.

As illustrated, the conduit assembly 400 includes a secondary connecting conduit 430 that extends generally between the substantially rigid conduit 402, the connecting conduit 404, and the substantially flexible conduit 406. The secondary connecting conduit 430 includes a flow portion 432 that substantially connects the flow path through the conduit assembly 400 between the connecting conduit 404 and the pipe 42. For example, the flow portion 432 substantially blocks the air or the air/material mixture from entering the bellow 418.

The secondary connecting conduit 430 also includes an interface portion 434 that extends between the substantially rigid conduit 402 and the substantially flexible conduit 406. As illustrated, the interface portion 434 includes an extension 436 extending into a groove 438 of the second end 412 of the substantially rigid conduit 402. The extension 436 may be secured to the groove 438 via a gear clamp, a band clamp, a press fit connection, vacuum pressure, or a combination thereof. The extension 436 of the secondary connecting conduit 430 is also coupled to the substantially flexible conduit 406 via a sealing ring 440 that extends from the substantially flexible conduit 406. The sealing ring 440 is configured to substantially maintain a seal between the substantially flexible conduit 406 and the secondary connecting conduit 430.

Accordingly, the embodiments of the conduit and the conduit assembly for an agricultural system described herein may enable the agricultural system to substantially isolate movement of certain components relative to one another. For example, the conduit or the conduit assembly may be coupled to a metering system (e.g., to a conduit connector of the metering system) and to a pipe. The conduit or the conduit assembly may flex to enable the metering system and the pipe to move relative to one another and/or to substantially isolate the movement of the metering system and the pipe relative to one another. Additionally or alternatively, the conduit or the conduit assembly may substantially isolate movement of the pipe relative to a storage tank coupled to the metering system. Further, the conduit or the conduit assembly may include a tapered flow section that either accelerates or decelerates the air or the air/material mixture flow, depending on the position relative to the metering system, through the conduit or the conduit assembly (e.g., causes the venturi effect). As such, the embodiments of the conduit and the conduit assembly described herein include components (e.g., bellow(s) and substantially rigid portion(s)) that enable the conduit or the conduit assembly to flex to isolate such movement and to remain substantially rigid to maintain connections within the agricultural system. The incorporation of such components that isolate movement facilitates weighing and/or estimating an amount of agricultural product within the storage tank(s) of the agricultural system. Additionally, isolating such movement enables the agricultural system to more easily traverse the field, a roadway, and other surfaces. Further, the flexible conduits and conduit assemblies described herein may reduce costs associated with the agricultural system.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A conduit for an agricultural system, comprising:
a first end configured to couple to a metering system;
a second end configured to couple to a pipe;
one or more bellows disposed adjacent to the second end and configured to enable the conduit to flex adjacent to the second end, wherein the one or more bellows comprise an interior surface configured to contact a flow of air, particulate material, or both, as the flow of air, particulate material, or both, flows from the first end to the second end; and
a substantially rigid portion extending generally longitudinally from the first end to the one or more bellows, wherein the substantially rigid portion substantially rigidly supports the conduit between the first end and the one or more bellows.

2. The conduit of claim 1, wherein the substantially rigid portion is tapered from the first end to the one or more bellows.

3. The conduit of claim 1, comprising a first sealing ring at the first end configured to form a seal between the first end and the metering system.

4. The conduit of claim 3, comprising a second sealing ring at the second end configured to form a seal between the second end and the pipe.

5. The conduit of claim 1, wherein the one or more bellows are generally circular.

6. The conduit of claim 1, wherein the one or more bellows are generally angular.

7. The conduit of claim 1, wherein the substantially rigid portion comprises one or more ribs extending generally longitudinally from the first end to the one or more bellows, wherein the one or more ribs substantially rigidly support the conduit between the first end and the one or more bellows.

8. The conduit of claim 1, wherein the conduit is configured to couple to the metering system and to the pipe via gear clamps, band clamps, press fit connections, vacuum pressure, or a combination thereof.

9. The conduit of claim 1, wherein a cross-sectional area of the conduit increases along a flow path through the conduit.

10. The conduit of claim 1, wherein the substantially rigid portion and the one or more bellows define a path of the flow of air, particulate material, or both, from the first end to the second end.

11. A conduit for an agricultural system, comprising:
one or more bellows disposed adjacent to a first end of the conduit and configured to enable the conduit to flex adjacent to the first end; and
a substantially rigid portion extending generally longitudinally from a second end of the conduit to the one or more bellows, wherein the substantially rigid portion is tapered from the first end to the one or more bellows, and wherein the one or more bellows comprise an interior surface configured to contact a flow of air, particulate material, or both, as the flow of air, particulate material, or both, flows from the second end to the first end.

12. The conduit of claim 11, wherein the first end is configured to couple to a pipe, and the second end is configured to couple to a metering system.

13. The conduit of claim 11, wherein the substantially rigid portion substantially rigidly supports the conduit between the second end and the one or more bellows.

14. The conduit of claim 11, wherein the substantially rigid portion comprises one or more ribs extending generally longitudinally from the second end to the one or more bellows, wherein the one or more ribs substantially rigidly support the conduit between the second end and the one or more bellows.

15. The conduit of claim 11, wherein the substantially rigid portion is upstream of the one or more bellows along a flow path through the conduit.

16. The conduit of claim 1, wherein the substantially rigid portion is continuously tapered from the first end to the one or more bellows.

* * * * *